United States Patent [19]

McPherson

[11] Patent Number: 4,793,602

[45] Date of Patent: Dec. 27, 1988

[54] LOCKING POWER CLAMP

[75] Inventor: Alexander W. McPherson, Farmington Hills, Mich.

[73] Assignee: De-Sta-Co Division, Dover Resources, Inc., Troy, Mich.

[21] Appl. No.: 112,265

[22] Filed: Oct. 26, 1987

[51] Int. Cl.$^4$ ............................ B23Q 3/03; B25B 1/04
[52] U.S. Cl. ..................................................... 269/34
[58] Field of Search ............... 269/24, 27, 31, 32, 269/34, 35, 285, 239, 228, 91, 93, 94; 308/6 R; 74/526

[56] References Cited

U.S. PATENT DOCUMENTS

| 492,931 | 3/1893 | Baird | 269/34 |
| 1,766,812 | 6/1930 | Damerell | 269/34 |
| 3,170,322 | 2/1965 | Cavanaugh | 269/34 |
| 4,458,889 | 7/1984 | McPherson et al. | 269/32 |

FOREIGN PATENT DOCUMENTS 2089707  6/1982  United Kingdom ............... 269/34

Primary Examiner—Robert C. Watson
Attorney, Agent, or Firm—Lloyd M. Forster

[57] ABSTRACT

Air pressure actuated locking gripper stack clamp wherein in a pair of gripper arms are equally and oppositely actuated by a central piston rod and track follower means with needle reaction bearings connected to the inner ends of a pair of arm actuating links. An oval air cylinder with major axis in the plane of gripper arm actuation accommodates installation in narrow space and compact stacking of multiple clamps.

1 Claim, 2 Drawing Sheets

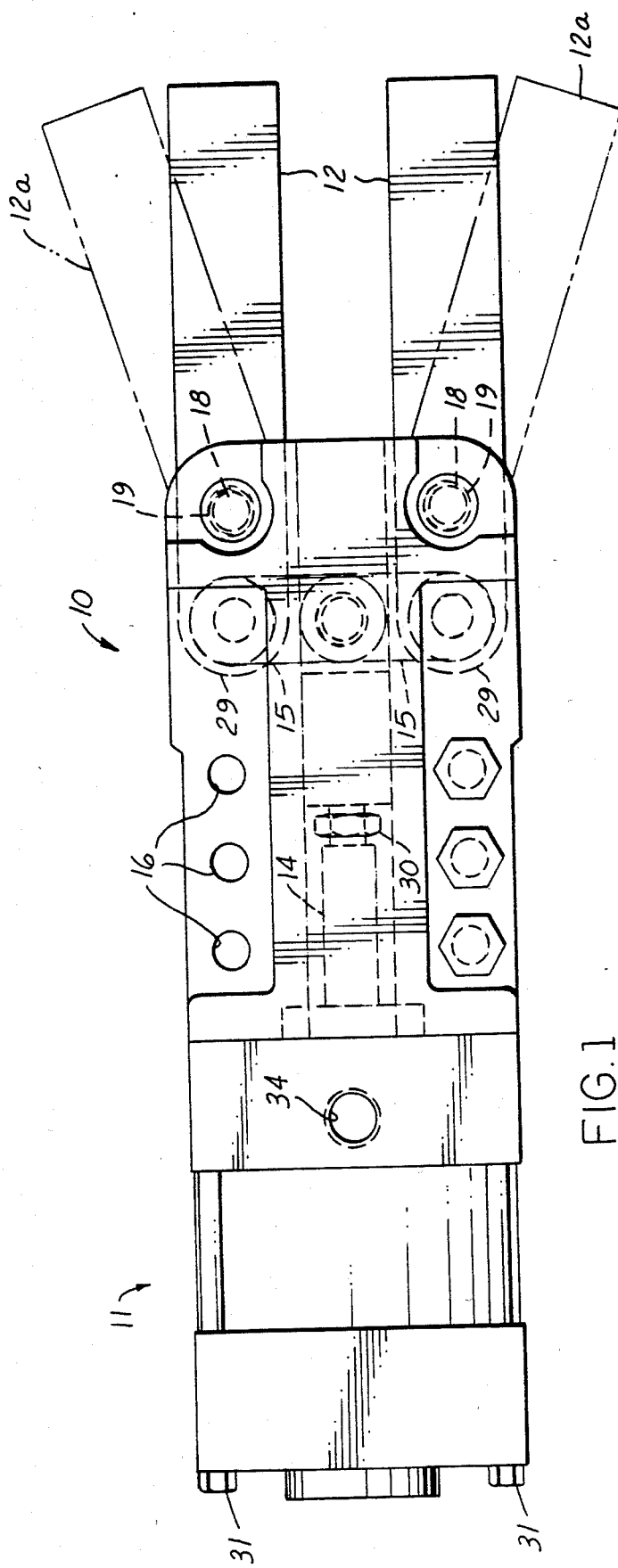
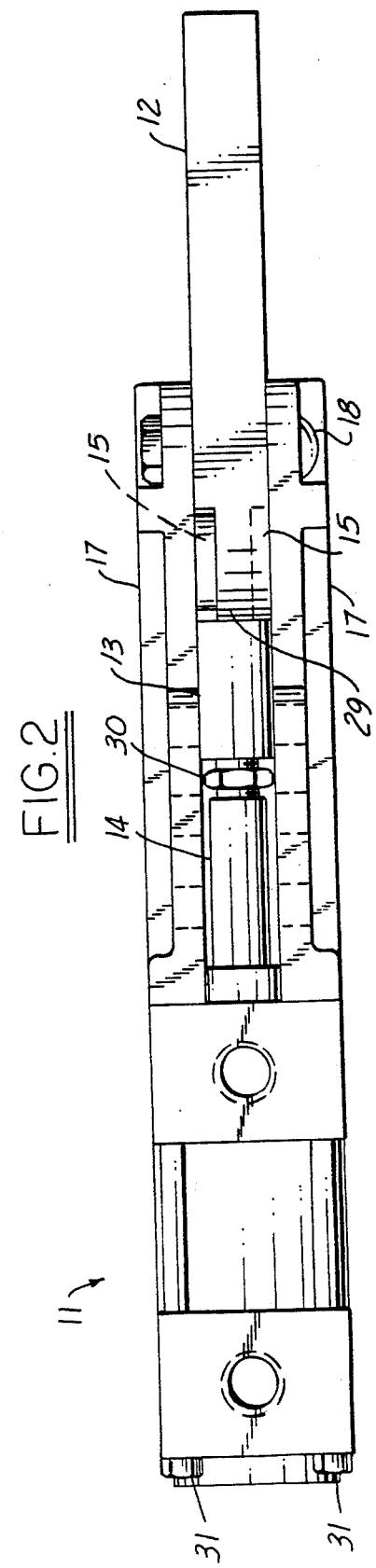
FIG.1
FIG.2

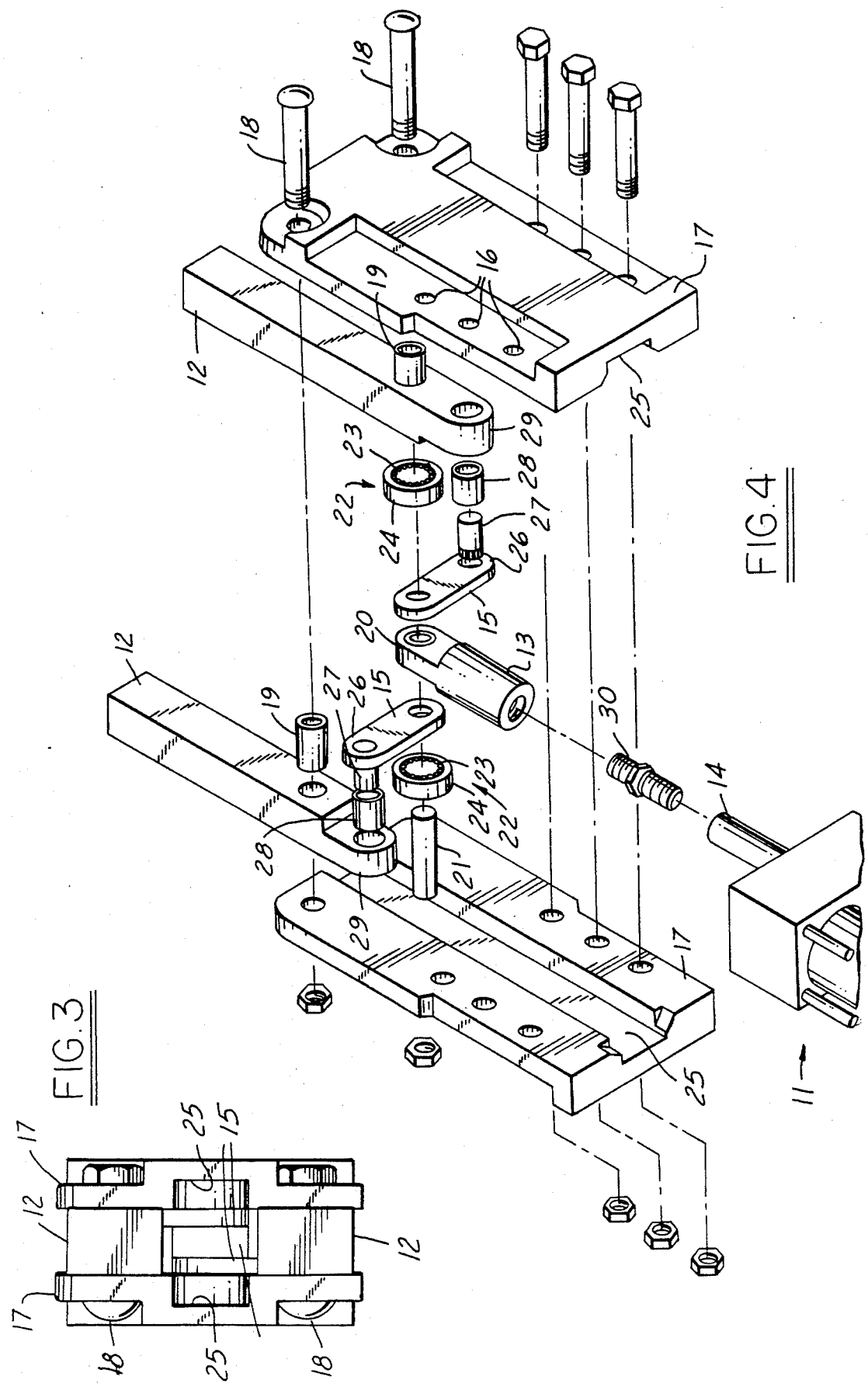

LOCKING POWER CLAMP

BACKGROUND OF THE INVENTION

A locking power clamp has been developed and disclosed in U.S. Pat. No. 4,458,889 which employs highly pressurized needle bearings in straight track portions of the clamp which actuate links connected to a pivoted clamp arm. In normal use, the clamp is bolted to a rigid fixture or other work support with the clamp arm, actuated by air pressure, adjusted to clamp the workpiece against the reaction surface of the work support. Toggle linkage is adapted to reach a center or slightly overcenter position which locks the arm in clamping engagement subject to retraction by the air cylinder with somewhat less force than the maximum clamping pressure force. This phenomenon of reduced requirement for release pressure is attributable to the use of special needle bearings as critical elements in the toggle linkage.

In a modification of the clamp illustrated in FIGS. 4 and 8 of the drawings, an auxilliary clamp arm is provided to travel in linear relation with the actuating piston rod toward a clamping relationship with the pivoting arm, clamping pressure in such case being limited to the axial force which is applied to the piston rod. With such feature a workpiece may be clamped between the pivoting arm and supplemental arm independent of any reaction base normally employed with a single clamp arm. If the supplemental arm is adapted with a right angle extended arm for parallel clamping relationship with a 180° pivoted arm, the limitation of axial force applied to the piston rod will not exist since the leverage of clamping force exerted against the auxilliary arm will be absorbed by spaced bearings on reaction track surfaces. However, in such case, the final clamping pressure will be exerted by clamping arm surfaces moving in relatively right angle relationship rather than converging on a preferred straight line relationship.

BRIEF SUMMARY OF THE PRESENT INVENTION

The special needle bearing feature of the U.S. Pat. No. 4,458,889 has now been adapted to provide equal gripper action with a pair of opposed clamp arms actuated by an oval air cylinder accommodating relatively narrow mounting openings as well as side by side stacking of a plurality of clamps with the minor axis of a cylinder employed in lateral stacking relation to conserve space for a given cumulative available clamping power based on the total area of the oval cylinders. Such oval cylinder per se and its inherent stacking advantage to conserve space is known in the art apart from its use in the present combination of high powered gripper clamp action.

Relative to the modification of the U.S. Pat. No. 4,458,889 employing an auxilliary clamp arm, the gripper action of the present clamp provides equal pivotal actuation of each gripper arm so as to approach opposed parallel surfaces of a given workpiece in a mutually normal direction with toggle linkage amplification of clamping pressure and without sliding on either surface of the workpiece, as contrasted with the auxilliary arm of the prior art U.S. Pat. No. 4,458,889 movement in a linear direction parallel to the piston rod, while the main clamp arm actuated by toggle linkage pivots toward a clamping relationship with the auxilliary arm. When the auxilliary arm extends normal to the direction of piston rod travel, both the auxilliary arm and the pivotal arm approach the workpiece in a normal direction subject however, to the limitation of clamping pressure based on linear piston rod force as well as the absence of locking action on any release of air pressure. On the other hand, if the auxilliary arm extends in the direction of piston rod travel, the clamping action will be subject to linear movement of the auxilliary arm relative to a workpiece surface while the clamping arm approaches a parallel surface in a normal direction.

By providing equal and opposite toggle action for the gripper arms of the present invention both locking action with toggle amplification of clamping pressure and normal engagement of both parallel surfaces of a workpiece by the respective gripper clamp arms are accomplished; and the capability of release actuation of both gripper arms from a locked centered or slightly overcentered toggle linkage with less than clamping actuating air pressure due to the needle bearing reaction track feature is likewise accomplished.

BRIEF DESCRIPTION OF THE DRAWINGS

FIG. 1 is a side elevation of the power clamp of the present invention;

FIG. 2 is a plan view of the clamp;

FIG. 3 is an end elevation of the clamp;

FIG. 4 is an exploded view of the power clamp illustrated in FIGS. 1, 2 and 3.

DETAILED DESCRIPTION OF PREFERRED EMBODIMENT

With reference to the drawing figures, the power clamp of the present invention comprises clamp head 10 actuated by oval power cylinder 11 adapted to move a pair of parallel clamp arms 12 through coupling 13, piston rod 14 and a pair of links 15 to the clamping position shown in full line relative to any intermediate workpiece, with the clamp head secured through mounting holes 16 to any fixture or mounting base relative to required workpiece gripping position. Clamp head 10 comprises two symetrical forged or cast body halves 17 connected by a pair of bolts 18 each passing through one of the clamp arms 12 with bearing spacers 19 serving to maintain pivotal clearance for respective clamp arms 12.

Linkage for actuating clamp arms 12 through piston rod 14 includes coupling 13 having reduced end 20 extending between links 15 connected thereto by shaft 21 forming the inner race for spaced needle bearings 22, each having needles 23 and outer track follower race 24 engaging longitudinal slot track 25. In each of the forged or cast halves 17 of clamp head 10, as best shown in FIG. 4, each link 15 is pivotally connected at one end 26 by pivot pin 27 and sleeve bearing 28 to reduced end 29 of clamp arm 12.

While the links 15 are illustrated in FIG. 4 inside of the narrowed ends 29 for clarity in showing the toggle relationship, in actual construction the narrowed ends 29 are positioned in alignment with reduced end 20 of coupling 13, links 15 being located on the other side as shown in FIG. 2.

In order to achieve positive locking of the clamp arms, needle bearings 22 pass slightly over center, beyond right angle relation relative to reaction guide track surface 25. Such limit is effected by travel of piston 14 limited by a stop within the cylinder and adjustment of the position of the coupling 13 relative thereto by adjustment screw 30 having differentially threaded ends.

From the description thus far, it will be seen that retraction of piston rod 14 from the locked condition of clamp arms 12 shown in full will pull needle bearings 22 and the ends of links 15 connected thereto by shaft 21 through center to a released condition and cause arms 12 to pivot about bolts 18 through a maximum arc of approximately 20° shown by dotted lines 12a. A relatively short piston stroke, typically less than one inch, may be used. Cylinder 11 is suitably secured to the end of clamp head 10 by four external bolts 31. Air supplied to the cap end provided at port 32 and at the rod end at optional port 33 or 34.

The oval configuration of the air cylinder provides a relatively narrow width as shown in the comparison of FIGS. 1 and 2 which accommodates location of the clamp body in narrow openings as well as stacking of multiple clamps side by side with space saving in the order of a ⅓ reduction from circular cylinders of equivalent clamping capacity.

I claim:

1. Power clamp comprising base means provided with reaction guide track means, track follower means, a pair of opposed clamp arm means each pivotally connect to said base means, actuating linkage means for each clamp arm means having spaced pivots respectively confined to said guide track means by said track follower means and having an actuating connection with said clamp arm means, coupling means adapted for connection with said clamp arm means, coupling means adapted for connection to a reciprocable power source for actuating said track follower means along said track means and through said linkage means to provide equal and opposite pivotal movement of said arm means to respective clamp and release positions, and stop means limiting said movement to a locked clamping position of each of said respective link means, said track following means including anti-friction bearing means with rolling elements adapted to enable release actuating movement with less force than clamp locking movement, said bearing means comprising a spaced pair of needle bearing track follower means operating in parallel opposed straight reaction guide tracks, a second pivotal link connection in each of said clamp arms spaced from said base pivotal connection, a pair of links each with spaced pivots, one of which is connected to said track follower means and the other of which is connected to said second pivotal connection of one of said clamp arms, whereby said reciprocation of said track follower means will simultaneously actuate said links and respective clamp arms toward and away from the clamping position, a common pivot shaft extending through both of said needle bearing track follower means, both of said links and said actuating connection, a reciprocable air cylinder power source for actuating said respective clamp arms with a stroke adapted to open each clamp arm through approximately a 20° angle and to close said clamp arms to a clamping positions wherein the pivotal connections of said respective links are in substantial alignment in a substantially right angle relationship with the connecting line of the pivots of each of said respective clamp arms, said reciprocable air cylinder power source comprising an oval air cylinder having its major axis in alignment with the plane of action of said clamp arms in order to accommodate a relatively narrow width of opening for installation in comparison to a circular air cylinder of equal capacity, and means for mounting the bases of a plurality of said clamps in stacked lateral relation to the plane of actuation of the clamp arms.

* * * * *